US012161242B2

(12) United States Patent
Hernandez et al.

(10) Patent No.: US 12,161,242 B2
(45) Date of Patent: Dec. 10, 2024

(54) CAKE COVERING ASSEMBLY

(71) Applicants: Raul Hernandez, Los Angeles, CA (US); David Hernandez, Los Angeles, CA (US)

(72) Inventors: Raul Hernandez, Los Angeles, CA (US); David Hernandez, Los Angeles, CA (US)

( * ) Notice: Subject to any disclaimer, the term of this patent is extended or adjusted under 35 U.S.C. 154(b) by 402 days.

(21) Appl. No.: 17/563,490

(22) Filed: Dec. 28, 2021

(65) Prior Publication Data

US 2023/0200574 A1 Jun. 29, 2023

(51) Int. Cl.
*A47G 19/26* (2006.01)
*F21V 35/00* (2006.01)
*F21W 121/00* (2006.01)

(52) U.S. Cl.
CPC .............. *A47G 19/26* (2013.01); *F21V 35/00* (2013.01); *A47G 2400/061* (2013.01); *F21W 2121/002* (2013.01)

(58) Field of Classification Search
CPC .. A47G 19/26; A47G 2400/061; F21V 35/00; F21W 2121/002
USPC .......................................................... 431/295
See application file for complete search history.

(56) References Cited

U.S. PATENT DOCUMENTS 2,758,458 A 8/1956 Carlson
4,938,688 A 7/1990 Wexler
5,096,274 A * 3/1992 Fuschetto .............. A47G 19/26 312/284
D446,083 S 8/2001 Marsh
D646,001 S * 9/2011 Blackman ....................... D26/23
8,668,088 B2 * 3/2014 Donnelly ............... A47G 19/26 431/295
9,402,490 B2 8/2016 Johnson
10,039,398 B1 8/2018 Daneshvar
2004/0224271 A1 * 11/2004 Langsam ............... A47G 19/00 431/295
2008/0268392 A1 * 10/2008 Bern ...................... A47G 19/00 431/295
2009/0053663 A1 * 2/2009 Okros .................... A47G 19/26 431/295
2009/0181335 A1 * 7/2009 Tropeano ................ F21S 13/14 431/295
2014/0272743 A1 * 9/2014 Hill ........................ A47G 19/26 431/295
2020/0060454 A1 2/2020 Mazzola

FOREIGN PATENT DOCUMENTS

CA 2481618 3/2005

* cited by examiner

*Primary Examiner* — Allen R. B. Schult
*Assistant Examiner* — William C Weinert

(57) ABSTRACT

A cake covering assembly for protecting a cake from airborne pathogens includes a cover that is positionable over a cake. The cover is comprised of a fluid impermeable material to protect the cake from airborne pathogens. The cover has a plurality of candle openings each extending through the cover. A plurality of candle holders is provided and each of the candle holders has a receiver to insertably receive a candle. Each of the candle holders is insertable through a respective one of the candle openings having the receiver being spaced above the cover. In this way each of the candle holders can support the candle in a vertical orientation thereby facilitating the candle to be blown out by a user in the convention of blowing out birthday candles.

9 Claims, 6 Drawing Sheets

CAKE COVERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to covering devices and more particularly pertains to a new covering device for protecting a cake from airborne pathogens. The device includes a cover with a plurality of candle openings that can be positioned over a cake. The device includes a plurality of closures, each being disposed on the cover, for closing each of the candle openings. The device includes a plurality of candle holders that is each insertable through a respective one of the candle openings. Each of the candle holders has a receiver for insertably receiving a candle. In no instance does the prior art disclose a cover which has a plurality of candle openings and a plurality of candle holders, each being insertable through a respective candle opening, which can insertably receive a candle.

(2) Description of Related Art Including Information Disclosed Under 37 CFR 1.97 and 1.98

The prior art relates to covering devices including a variety of cake covers that each at least has a plurality of candle wells for insertably receiving candles. The prior art discloses a cake cover device that includes a cover that is positionable over a cake and which has a plurality of candle openings for insertably receiving candles and a lid that is positionable over the cover when candle are removed from the cover.

BRIEF SUMMARY OF THE INVENTION

An embodiment of the disclosure meets the needs presented above by generally comprising a cover that is positionable over a cake. The cover is comprised of a fluid impermeable material to protect the cake from airborne pathogens. The cover has a plurality of candle openings each extending through the cover. A plurality of candle holders is provided and each of the candle holders has a receiver to insertably receive a candle. Each of the candle holders is insertable through a respective one of the candle openings having the receiver being spaced above the cover. In this way each of the candle holders can support the candle in a vertical orientation thereby facilitating the candle to be blown out by a user in the convention of blowing out birthday candles.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
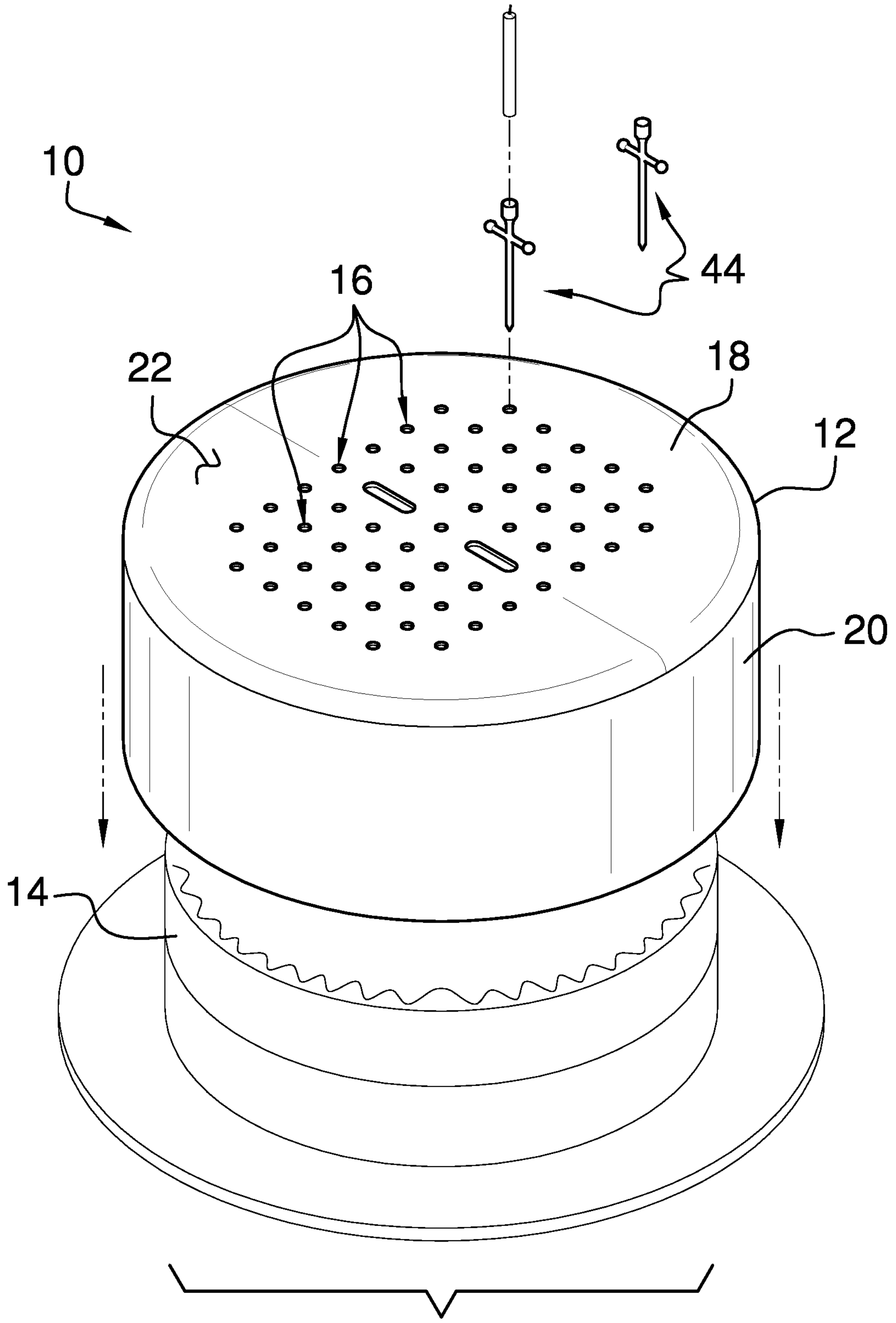
FIG. 1 is an exploded perspective view of a cake covering assembly according to an embodiment of the disclosure.
Figure 2:
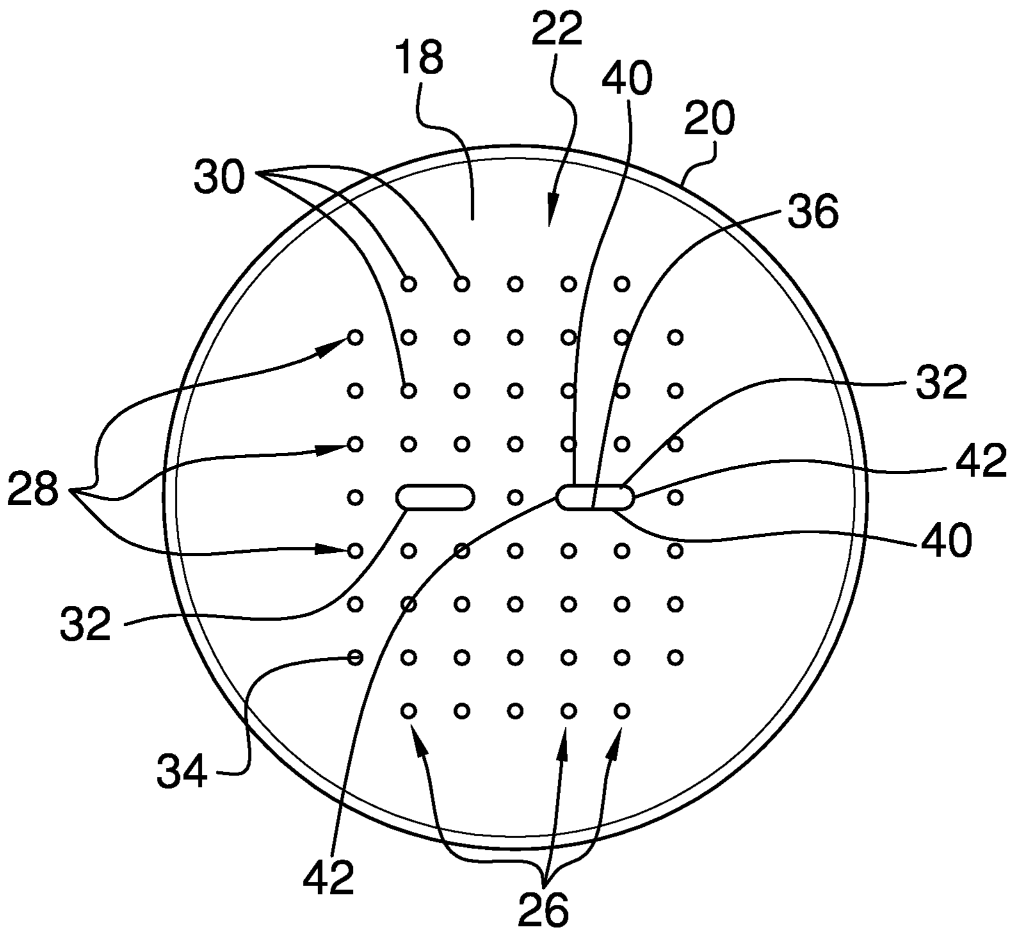
FIG. 2 is a top view of a cover of an embodiment of the disclosure.
Figure 3:
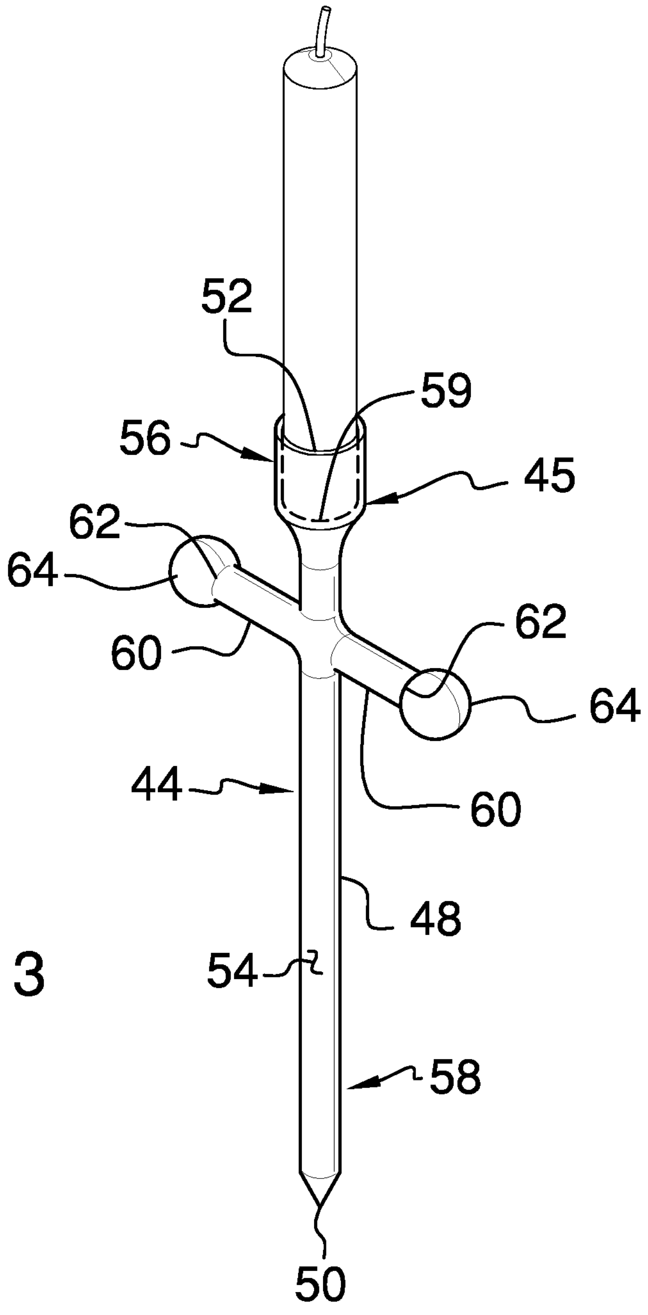
FIG. 3 is a perspective view of candle holder of an embodiment of the disclosure.
Figure 4:
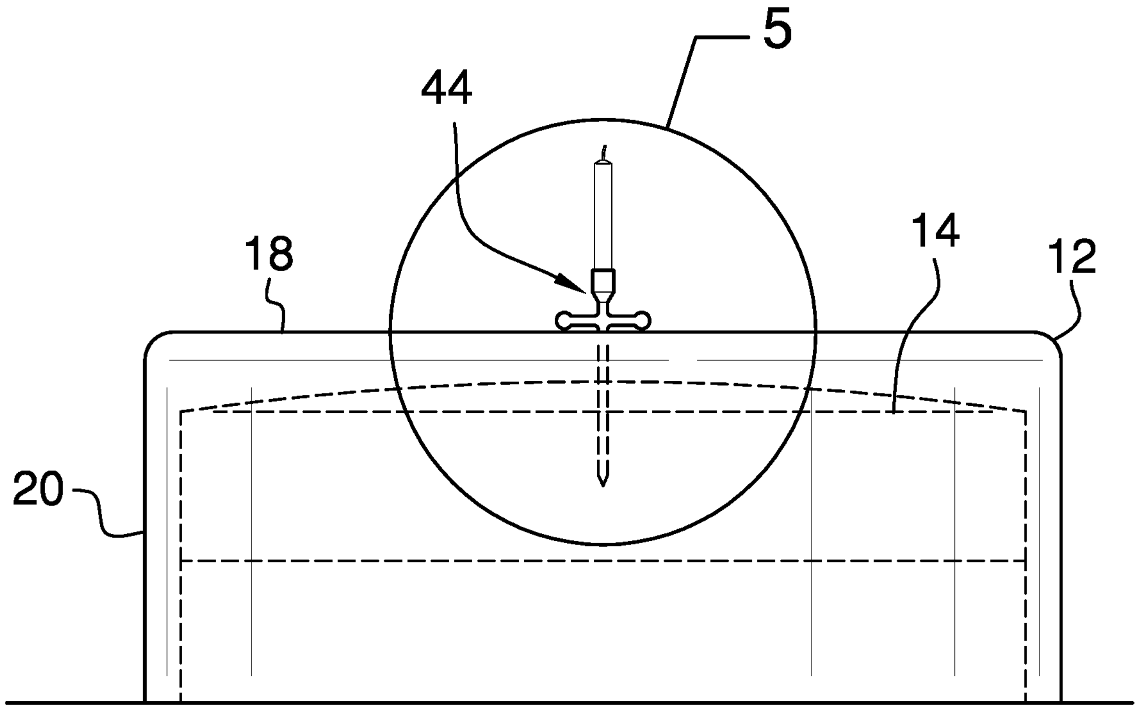
FIG. 4 is a phantom in-use view of an embodiment of the disclosure.

With reference now to the drawings, and in particular to FIGS. 1 through 7 thereof, a new covering device embodying the principles and concepts of an embodiment of the disclosure and generally designated by the reference numeral 10 will be described.

As best illustrated in FIGS. 1 through 7, the cake covering assembly 10 generally comprises a cover 12 that is positionable over a cake 14 and the cover 12 is comprised of a fluid impermeable material to protect the cake 14 from airborne pathogens. The cover 12 is comprised of a translucent material to facilitate the cake 14 to be visible beneath the cover 12. The cover 12 has a plurality of candle openings 16 each extends through the cover 12. The cover 12 has a top wall 18 and a perimeter wall 20 extending downwardly from the top wall 18, and the top wall 18 has a top surface 22 and a bottom surface 24. Each of the candle openings 16 extends through the top surface 22 and the bottom surface 24 of the top wall 18, and the plurality of candle openings 16 is arranged into a plurality of columns 26 and rows 28 on the top wall 18.

The plurality of candle openings 16 includes a set of first candle openings 30 and a set of second candle openings 32. Each of the first candle openings 30 has a bounding edge 34 that is continuously arcuate such that each of the first candle openings 30 has a circular shape. Each of the second candle openings 32 has a bounding edge 36 which has a pair of curved portions 38 that is disposed on opposing ends of a pair of elongate portions 40 such that each of the second candle openings 32 has an ovoid shape. In this way the second candle openings 32 can accommodate a numerical candle that is commonly employed to indicate the age of a person celebrating a birthday. Furthermore, each of the second candle openings 32 is surrounded by the first candle openings 30.

Figure 5:
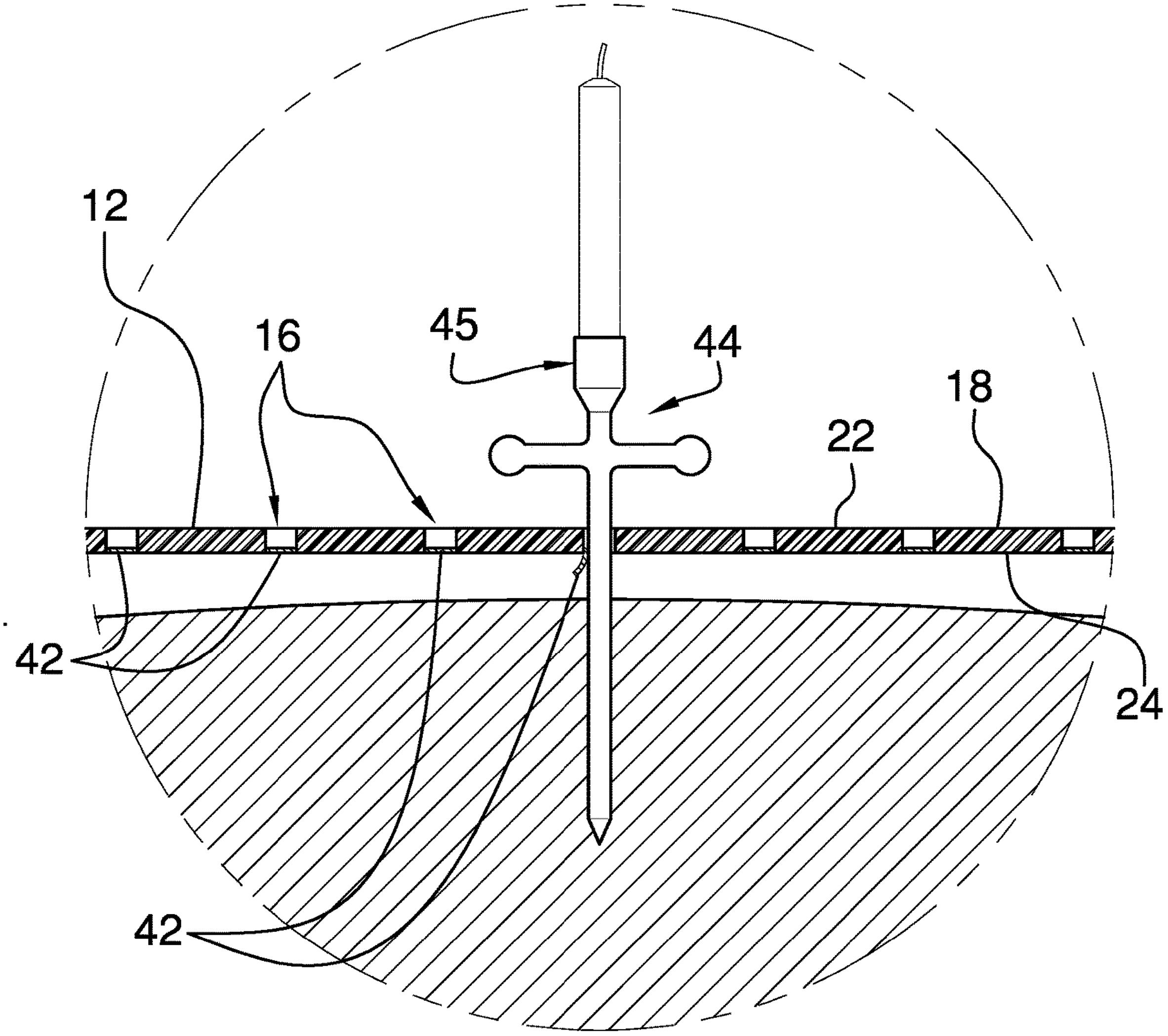
FIG. 5 is a cut-away view taken from circle 5 of FIG. 4 of an embodiment of the disclosure.
Figure 6:
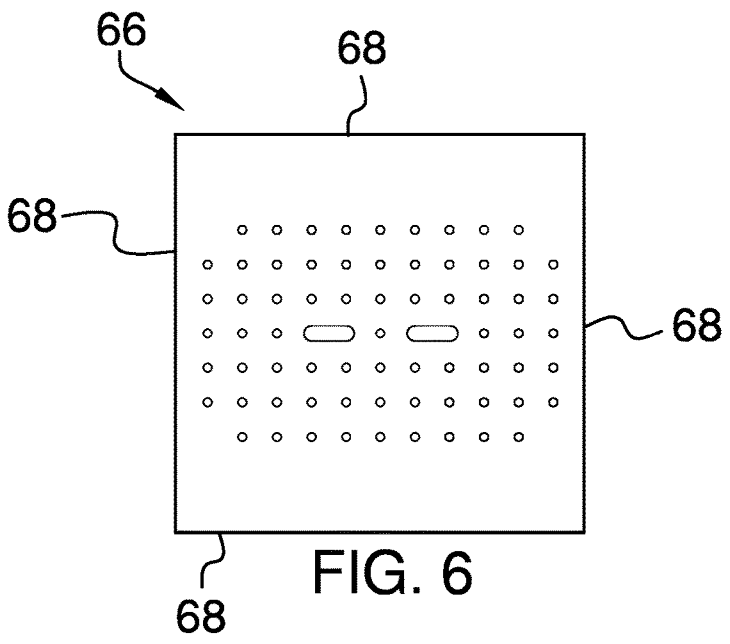
FIG. 6 is a top view of an alternative embodiment of the disclosure.
Figure 7:
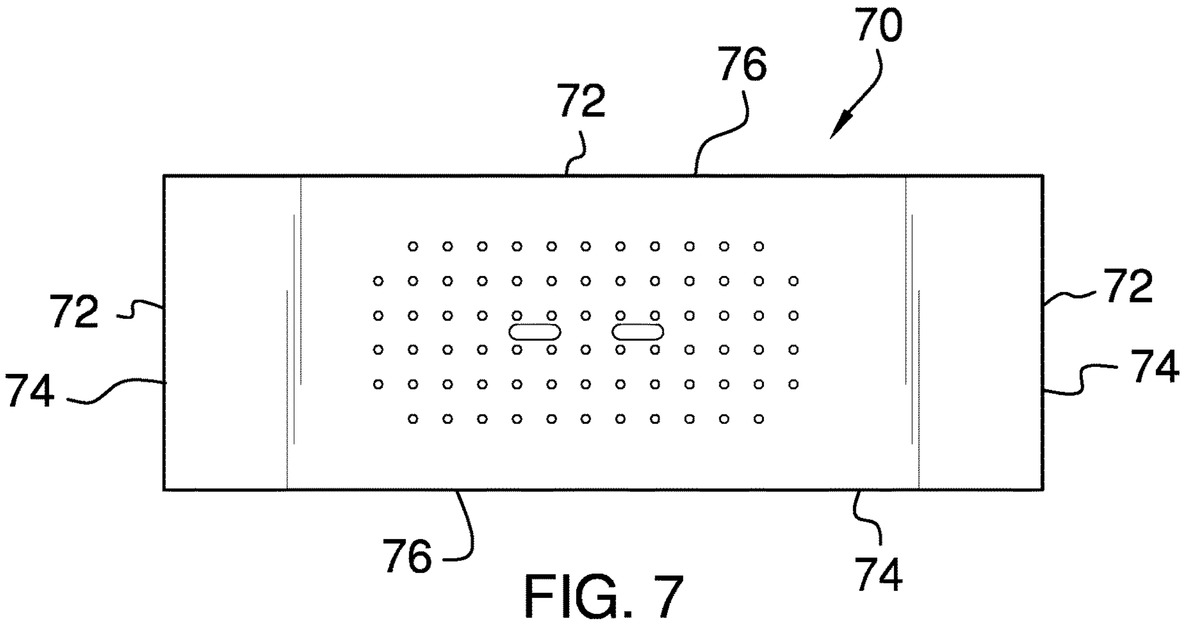
FIG. 7 is a top perspective view of an alternative embodiment of the disclosure.

As is most clearly shown in FIG. 5, a plurality of closures 42 is provided and each of the closures 42 is coupled to the bottom surface 24 of the top wall 18. Each of the closures 42 is aligned with a respective one of the candle openings 16 and each of the closures 42 is biased to extend across the respective candle 46 opening 16. Each of the closures 42 is urgeable into an open position having the closures 42 extending downwardly from the bottom surface 24. Each of the closures 42 is comprised of a fluid impermeable material to inhibit airborne pathogens from passing through the openings. Additionally, each of the closures 42 may comprise a flexible membrane such as plastic, silicone, rubber or other type of similar material.

A plurality of candle holders 44 is provided and each of the candle holders 44 has a receiver 45 to insertably receive a candle 46. Each of the candle holders 44 is insertable through a respective one of the candle openings 16 having the receiver 45 being spaced above the cover 12. In this way each of the candle holders 44 can support the candle 46 in a vertical orientation thereby facilitating the candle 46 to be blown out by a user in the convention of blowing out birthday candles. Each of the candle holders 44 comprises a stem 48 that has a lower end 50, an upper end 52 and an outer surface 54 extending between the upper end 52 and the lower end 50, and the stem 48 is elongated between the upper end 52 and the lower end 50.

The outer surface 54 flares outwardly adjacent to the upper end 52 to define an upper portion 56 of the stem 48 that has a diameter which is greater than a diameter of a lower portion 58 of the stem 48. The upper end 52 is associated with the upper portion 56 and the lower end 50 is associated with the lower portion 58. The upper end 52 has a well 59 extending into the upper portion 56 of the stem 48 such that the upper portion 56 of the stem 48 defines the receiver 45. The lower end 50 tapers to a point to penetrate the cake 14 when the stem 48 is inserted through a respective one of the candle openings 16. The closure 46 which is aligned with the candle 46 opening through which the stem 48 is extended is urged into the open position when the stem 48 is extended through the candle 46 opening.

A pair of handles 60 is provided and each of the handles 60 extends laterally away from the outer surface 54 of the stem 48. Each of the handles 60 is positioned on the lower portion 58 at a point that is located adjacent to the upper portion 56. Furthermore, each of the handles 60 extends away from the stem 48 in opposite directions from each other. Each of the handles 60 has a distal end 62 with respect to the outer surface 54 and a ball 64 is disposed on the distal end 62 of each of the handles 60. Each of the handles 60 abuts the top surface 22 of the top wall 18 when the stem 48 is inserted through the respective candle 46 opening for inhibiting the candle 46 holder from passing through the cover 12.

The perimeter wall 20 of the cover 12 is continuously arcuate about a center point of the top wall 18 such that the perimeter wall 20 defines a circular shape. In an alternative embodiment 66 as is most clearly shown in FIG. 6, the perimeter wall 20 has a plurality of intersecting sides 68 and each of the intersecting sides 68 has an equal length such that the perimeter wall 20 defines a square shape. In an alternative embodiment 70 as is most clearly shown in FIG. 7, the perimeter wall 20 has a plurality of intersecting sides 72 and the plurality of intersecting sides 72 includes a pair of first sides 74 and a pair of second sides 76. Each of the first sides 74 is oriented parallel with each other and each of the second sides 76 is oriented parallel with each other. Each of the first sides 74 has a length that is less than a length of each of the second sides 76 such that the perimeter wall 20 defines a rectangular shape.

In use, the cover 12 is positioned over the cake 14 and a desired number of the candle holders 44 is extended through chosen candle openings 16 in the cover 12 to penetrate the cake 14. A plurality of candles 46 is each inserted into the receiver 45 in a respective candle holder 44 such that the candles 46 are vertically oriented. Each of the candles 46 is lit to facilitate a person celebrating their birthday to blow out the candles 46 in the convention of birthday celebrations. The cover 12 and each of the closures 42 inhibits airborne pathogens, such as bacteria or viruses that may be exhaled by the person blowing out the candles 46, from contacting the cake 14. In this way individuals that eat the cake 14 are protected from coming into contact with the airborne pathogens when the cake 14 is eaten. The cover 12 is removed from the cake 14 when the candles 46 are blown out to facilitate the cake 14 to be eaten.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A cake covering assembly for protecting a cake from airborne pathogens resulting from blowing out candles on the cake, said assembly comprising:

a cover being positionable over a cake, said cover being comprised of a fluid impermeable material wherein said cover is configured to protect the cake from airborne pathogens, said cover being comprised of a translucent material wherein said cover is configured to facilitate the cake to be visible beneath said cover, said cover having a plurality of candle openings each extending through said cover;

a plurality of candle holders, each of said candle holders having a receiver wherein said receiver is configured to insertably receive a candle, each of said candle holders being insertable through a respective one of said candle openings having said receiver being spaced above said cover wherein each of said candle holders is configured to support the candle in a vertical orientation thereby facilitating the candle to be blown out by a user in the convention of blowing out birthday candles;

wherein each of said candle holders comprises a stem having a lower end, an upper end and an outer surface extending between said upper end and said lower end, said stem being elongated between said upper end and said lower end, said outer surface flaring outwardly adjacent to said upper end to define an upper portion of said stem having a diameter being greater than a diameter of a lower portion of said stem, said upper end being associated with said upper portion, said lower end being associated with said lower portion;

wherein said upper end has a well extending into said upper portion of said stem such that said upper portion of said stem defines said receiver, said lower end tapering to a point wherein said lower end is configured to penetrate the cake when said stem is inserted through a respective one of said candle openings;

wherein each of said candle holders includes a pair of handles, each of said handles extending laterally away from said outer surface of said stem, each of said handles being positioned on said lower portion at a point being located adjacent to said upper portion, each of said handles extending away from said stem in opposite directions from each other; and wherein each of said handles has a distal end with respect to said outer surface, said distal end of each of said handles having a ball being disposed on said distal end, each of said handles abutting said top surface of said top wall when said stem is inserted through said respective candle opening for inhibiting said candle holder from passing through said cover.

2. The assembly according to claim 1, wherein;

said cover has a top wall and a perimeter wall extending downwardly from said top wall, said top wall having a top surface and a bottom surface, each of said candle openings extending through said top surface and said bottom surface of said top wall, said plurality of candle openings being arranged into a plurality of columns and rows on said top wall;

said plurality of candle openings including a set of first candle openings and a set of second candle openings, each of said first candle openings having a bounding edge being continuously arcuate such that each of said first candle openings has a circular shape, each of said second candle openings having a bounding edge having a pair of curved portions being disposed on opposing ends of a pair of elongate portions such that each of said second candle openings has an ovoid shape, each of said second candle openings being surrounded by said first candle openings.

3. The assembly according to claim 2, further comprising a plurality of closures, each of said closures being coupled to said bottom surface of said top wall, each of said closures being aligned with a respective one of said candle openings, each of said closures being biased to extend across said respective candle opening.

4. The assembly according to claim 3, wherein each of said closures is urgeable into an open position having said closures extending downwardly from said bottom surface, each of said closures being comprised of a fluid impermeable material wherein each of said closures is configured to inhibit airborne pathogens from passing through said openings.

5. The assembly according to claim 1, wherein:

said cover has a top wall, said top wall having a top surface and a bottom surface, each of said candle openings extending through said top surface and said bottom surface;

said assembly includes a plurality of closures, each of said closures being coupled to said bottom surface of said top wall, each of said closures being aligned with a respective one of said candle openings, each of said closures being biased to extend across said respective candle opening, each of said closures being urgeable into an open position having said closures extending downwardly from said bottom surface, each of said closures being comprised of a fluid impermeable material wherein each of said closures is configured to inhibit airborne pathogens from passing through said openings; and said closure being aligned with said candle opening through which said stem is extended is urged into said open position when said stem is extended through said candle opening.

6. A cake covering assembly for protecting a cake from airborne pathogens resulting from blowing out candles on the cake, said assembly comprising:

a cover being positionable over a cake, said cover being comprised of a fluid impermeable material wherein said cover is configured to protect the cake from airborne pathogens, said cover being comprised of a translucent material wherein said cover is configured to facilitate the cake to be visible beneath said cover, said cover having a plurality of candle openings each extending through said cover, said cover having a top wall and a perimeter wall extending downwardly from said top wall, said top wall having a top surface and a bottom surface, each of said candle openings extending through said top surface and said bottom surface of said top wall, said plurality of candle openings being arranged into a plurality of columns and rows on said top wall, said plurality of candle openings including a set of first candle openings and a set of second candle openings, each of said first candle openings having a bounding edge being continuously arcuate such that each of said first candle openings has a circular shape, each of said second candle openings having a bounding edge having a pair of curved portions being disposed on opposing ends of a pair of elongate portions such that each of said second candle openings has an ovoid shape, each of said second candle openings being surrounded by said first candle openings;

a plurality of closures, each of said closures being coupled to said bottom surface of said top wall, each of said closures being aligned with a respective one of said candle openings, each of said closures being biased to extend across said respective candle opening, each of said closures being urgeable into a open position having said closures extending downwardly from said bottom surface, each of said closures being comprised of a fluid impermeable material wherein each of said closures is configured to inhibit airborne pathogens from passing through said openings; and a plurality of candle holders, each of said candle holders having a receiver wherein said receiver is configured to insertably receive a candle, each of said candle holders being insertable through a respective one of said candle openings having said receiver being spaced above said cover wherein each of said candle holders is configured to support the candle in a vertical orientation thereby facilitating the candle to be blown out by a user in the convention of blowing out birthday candles, each of said candle holders comprising:

a stem having a lower end, an upper end and an outer surface extending between said upper end and said lower end, said stem being elongated between said upper end and said lower end, said outer surface flaring outwardly adjacent to said upper end to define an upper portion of said stem having a diameter being greater than a diameter of a lower portion of said stem, said upper end being associated with said upper portion, said lower end being associated with said lower portion, said upper end having a well extending into said upper portion of said stem such that said upper portion of said stem defines said receiver, said lower end tapering to a point wherein said lower end is configured to penetrate the cake when said stem is inserted through a respective one of said candle openings, said closure being aligned with said candle opening through which said stem is extended being urged into said open position; and a pair of handles, each of said handles extending laterally away from said outer surface of said stem, each of said handles being positioned on said lower portion at a point being located adjacent to said upper portion, each of said handles extending away from said stem in opposite directions from each other, each of said handles having a distal end with respect to said outer surface, said distal end of each of said handles having a ball being disposed on said distal end, each of said handles abutting said top surface of said top wall when said stem is inserted through said respective candle opening for inhibiting said candle holder from passing through said cover.

7. The assembly according to claim 6, wherein said perimeter wall of said cover is continuously arcuate about a center point of said top wall such that said perimeter wall defines a circular shape.

8. The assembly according to claim 6, wherein said perimeter wall has a plurality of intersecting sides, each of said intersecting sides having an equal length such that said perimeter wall defines a square shape.

9. The assembly according to claim 6, wherein said perimeter wall has a plurality of intersecting sides, said plurality of intersecting sides having a pair of first sides and a pair of second sides, each of said first sides being oriented parallel with each other, each of said second sides being oriented parallel with each other, each of said first sides having a length being less than a length of each of said second sides such that said perimeter wall defines a rectangular shape.

* * * * *